US00RE46401E

(19) United States
(12) Reissued Patent
Estes

(10) Patent Number: US RE46,401 E
(45) Date of Reissued Patent: May 16, 2017

(54) CONCAVE WITH AN ARRAY OF LONGITUDINALLY NOTCHED SPACED APART THRESHING ELEMENTS

(71) Applicant: Donald J. Estes, Frankfort, IN (US)

(72) Inventor: Donald J. Estes, Frankfort, IN (US)

(21) Appl. No.: 14/729,653

(22) Filed: Jun. 3, 2015

Related U.S. Patent Documents

Reissue of:
(64) Patent No.: 8,454,416
Issued: Jun. 4, 2013
Appl. No.: 13/573,046
Filed: Aug. 15, 2012

U.S. Applications:
(60) Provisional application No. 61/573,644, filed on Sep. 9, 2011.

(51) Int. Cl.
*A01F 12/24* (2006.01)

(52) U.S. Cl.
CPC ..... *A01F 12/24* (2013.01)

(58) Field of Classification Search
CPC ..... A01F 12/24
USPC ..... 460/107, 108, 110
See application file for complete search history.

(56) References Cited

U.S. PATENT DOCUMENTS

| | | | | | |
|---|---|---|---|---|---|
| 773,664 | A | * | 11/1904 | More | 460/40 |
| 1,570,898 | A | * | 1/1926 | Landis | 460/110 |
| 1,970,797 | A | * | 8/1934 | Coultas | 460/31 |
| 2,321,019 | A | * | 6/1943 | Dray | 460/71 |
| 2,484,228 | A | * | 10/1949 | Isay | 460/46 |
| 2,569,175 | A | * | 9/1951 | Karlsson | 460/32 |
| 2,768,626 | A | * | 10/1956 | Pelowski | 460/32 |
| 2,863,551 | A | * | 12/1958 | Bilocq | 198/456 |
| 3,115,087 | A | * | 12/1963 | Ginaven | 100/129 |
| 3,378,985 | A | * | 4/1968 | Bugan | 52/852 |
| 3,515,145 | A | * | 6/1970 | Herbsthofer | 460/110 |

(Continued)

FOREIGN PATENT DOCUMENTS

| | | | |
|---|---|---|---|
| DE | 3303413 | A1 * | 8/1984 |
| JP | 2011057427 | A * | 3/2011 |

*Primary Examiner* — Matthew C Graham
(74) *Attorney, Agent, or Firm* — Taylor IP, P.C.

(57) ABSTRACT

[A concave includes a frame and an array of threshing elements supported by the frame, the threshing elements being spaced apart and extending generally parallel to one another. The threshing elements are configured in the form of round bars each having formed on an upper portion thereof disposed adjacent to an upper portion of the frame a longitudinally-extending notch respectively defining an aggressive threshing edge. The spaced apart relationship and round configuration of the threshing elements reduce plugging of the concave. The threshing edges facing in a direction opposite to the direction of crop material flow restrict crop material flow and thereby enable more effective threshing.] *A concave includes a frame and an array of threshing elements supported by the frame, the threshing elements being spaced apart and extending generally parallel to one another. The threshing elements each have formed on an upper portion thereof disposed adjacent to an upper portion of the frame a longitudinally-extending notch respectively defining an aggressive threshing edge. The spaced apart relationship of the threshing elements reduce plugging of the concave. The threshing edges facing in a direction opposite to the direction of rotation of a harvester rotor.*

22 Claims, 6 Drawing Sheets

(56) References Cited

U.S. PATENT DOCUMENTS

| | | | | | |
|---|---|---|---|---|---|
| 3,678,938 | A | * | 7/1972 | De Coene | 460/73 |
| 3,946,746 | A | * | 3/1976 | Decoene et al. | 460/73 |
| 4,075,823 | A | * | 2/1978 | Rowland-Hill | 56/14.6 |
| 4,378,024 | A | * | 3/1983 | De Busscher et al. | 460/73 |
| 4,383,652 | A | * | 5/1983 | Osborne et al. | 241/88.4 |
| 4,497,328 | A | | 2/1985 | Alm et al. | |
| RE31,860 | E | * | 4/1985 | Decoene et al. | 460/75 |
| 4,606,355 | A | * | 8/1986 | Dammann | 460/69 |
| 4,875,891 | A | | 10/1989 | Turner et al. | |
| 4,909,772 | A | * | 3/1990 | Kuchar | 460/71 |
| 5,024,631 | A | * | 6/1991 | Heidjann et al. | 460/75 |
| 5,057,056 | A | * | 10/1991 | Kambeitz | 460/110 |
| 5,489,239 | A | * | 2/1996 | Matousek et al. | 460/62 |
| 5,569,080 | A | * | 10/1996 | Estes | 460/72 |
| 5,613,907 | A | | 3/1997 | Harden | |
| 5,816,911 | A | * | 10/1998 | Dwyer | 460/71 |
| 6,036,598 | A | * | 3/2000 | Harden et al. | 460/66 |
| 6,074,297 | A | * | 6/2000 | Kuchar | 460/46 |
| 6,193,604 | B1 | | 2/2001 | Ramp et al. | |
| 6,251,008 | B1 | * | 6/2001 | Mietzel | 460/32 |
| 6,358,142 | B1 | * | 3/2002 | Imel et al. | 460/109 |
| 6,447,394 | B1 | * | 9/2002 | Gryspeerdt | 460/109 |
| 6,485,364 | B1 | * | 11/2002 | Gryspeerdt et al. | 460/107 |
| 6,503,142 | B2 | * | 1/2003 | Imel et al. | 460/107 |
| 6,537,148 | B2 | * | 3/2003 | Schwersmann | 460/107 |
| 7,166,026 | B2 | * | 1/2007 | Ricketts et al. | 460/108 |
| 7,285,043 | B2 | | 10/2007 | Foster et al. | |
| 7,749,055 | B2 | * | 7/2010 | Ricketts | 460/108 |
| D624,939 | S | * | 10/2010 | Flickinger et al. | D15/28 |
| 2005/0197176 | A1 | * | 9/2005 | Foster et al. | 460/108 |
| 2011/0070933 | A1 | * | 3/2011 | Imbert | A01F 12/442 460/66 |
| 2012/0177317 | A1 | * | 7/2012 | Hofmann et al. | 384/523 |

* cited by examiner

CONCAVE WITH AN ARRAY OF LONGITUDINALLY NOTCHED SPACED APART THRESHING ELEMENTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This patent application claims the benefit of U.S. provisional application No. 61/573,644 filed Sep. 9, 2011. The disclosure of said provisional application is hereby incorporated herein by reference thereto.

BACKGROUND OF THE INVENTION

1. Field of the Invention

The present invention generally relates to a concave for an agricultural combine and, more particularly, is concerned with a concave with an array of longitudinally notched spaced apart threshing elements that reduce concave plugging and enable more effective threshing.

2. Description of the Prior Art

Rotary combines have a rotary crop processing unit that threshes and separates the grain from the harvested crop material. The rotary crop processing unit is formed by a rotor radially surrounded by a casing. The rotor and casing together define an inlet section, a threshing section and a separating section. As disclosed in U.S. Pat. No. 6,193,604 to Ramp et al., the bottom of the casing has a concave under the threshing section for threshing the crop material and a separating grate under the separator section for separating the grain from the threshed crop material. The inlet section pulls the harvested crop material from a front crop gathering unit into the threshing section. The threshing section threshes the crop material and then feeds the threshed crop material to the separator section.

As shown in the Ramp et al. patent, the concave is provided with a combination of threshing elements in the form of straight bars square in cross-section that are spaced apart from one another with wires between the bars. The objective of this combination is to restrict the flow of crop material so as to enhance threshing of the crop material in the threshing section. However, under corn crop conditions, a tendency frequently develops for crop material flow to be restricted too much by corn shucks getting hung up on the bars and catching on the wires, resulting in plugging of the concave. One solution tried thus far has been to change the threshing elements of the concave to round bars with no wires. But now a tendency frequently develops under some crop conditions, other than corn, for too little restriction of crop material flow such that the other crop materials are not threshed effectively, resulting in overloading of the separator section.

Consequently, a need remains for innovation that will provide a solution to the aforementioned problems.

SUMMARY OF THE INVENTION

The present invention provides a concave designed to overcome the above-described drawbacks and satisfy the aforementioned need. The concave of the present invention incorporates an array of spaced apart threshing elements in the form of round bars that have longitudinal notches formed on their upper portions respectively defining aggressive threshing edges. The round configuration of the spaced apart bars reduces plugging of the concave as the threshing edges of the longitudinal notches, facing in a direction opposite to the direction of crop material flow, restrict crop material flow and thereby enable more effective threshing.

Accordingly, the present invention is directed to a concave which includes a frame and an array of threshing elements supported by the frame and being spaced apart and extending generally parallel to one another. The threshing elements are elongated bars having round configurations in cross-section. Each bar has a notch formed therein defining an aggressive threshing edge recessed into the bar and disposed adjacent to an upper portion of the frame and facing opposite to the direction of crop material flow relative to said concave.

More particularly, each bar has an upper portion and a lower portion underlying the upper portion such that the upper portion extends upwardly from the lower portion with the notch adjacent to the upper portion and above the lower portion of the bar and extending longitudinally between opposite ends of the bar. The notch of each bar is defined by a first surface on the lower portion of the bar and a second surface on the upper portion of the bar extending upright from and in transverse relation to the first surface.

The frame includes a pair of opposite side members and a pair of end members spaced apart from and extending generally parallel to one another and having ends joined to corresponding ends of the opposite side members. The frame further includes at least one intermediate member spaced between and extending generally parallel the opposite end members and extending between and joined to the opposite side members. The opposite end members and intermediate member have top edges and openings formed in the opposite end members and the intermediate member adjacent to and below said top edges. The openings are spaced apart from one another such that the bars extend past the intermediate member and between the opposite end members with the opposite ends of the bars seated in the openings of the opposite end members and the intermediate member. Further, the opposite end members and the intermediate member together are curved in configuration such that their top edges lie along a common surface curved in configuration.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 8:
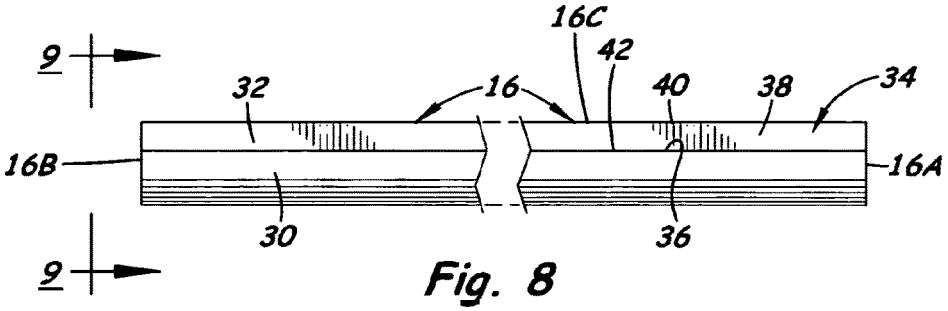
FIG. 8 is an enlarged foreshortened front elevational view of one of the threshing elements of the concave.
Figure 9:
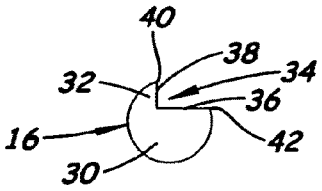
FIG. 9 is an end elevational view of the one threshing element as seen along line 9-9 in FIG. 8.

Referring to the drawings, and particularly to FIGS. 1-4, there is illustrated an exemplary embodiment of a threshing concave, generally designated 10, having a construction in accordance with the present invention. The concave 10 includes a frame 12 and an array 14 of elongated threshing elements 16 supported by the frame 12. Each of the threshing elements 16, as best seen in FIGS. 8 and 9, has a cross-sectional configuration in accordance with the present invention. The components of the concave 10 are made of a suitable substantially rigid material, such as steel.

Figures 5, 6:
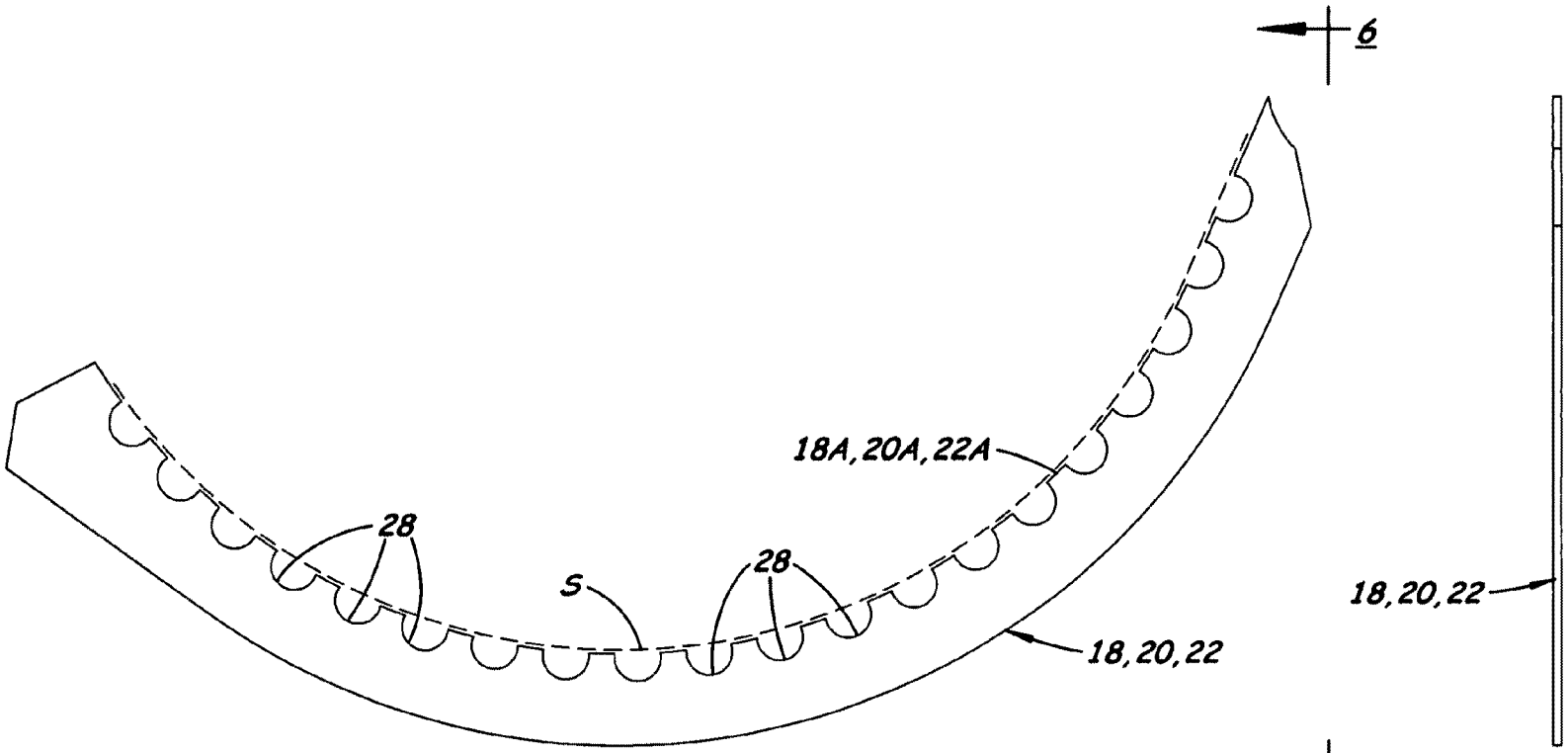
FIG. 5 is an enlarged end elevational view of a representative one of a pair of opposite end frame members and an intermediate frame member of the concave of FIGS. 1-3 showing one configuration of openings formed in the frame members for seating the array of threshing elements as shown in FIG. 7.
FIG. 6 is a side elevational view of the one end member of the concave as seen along line 6-6 in FIG. 5.

More particularly, referring now to FIGS. 1-6 *and 12*, the frame 12 is formed by opposite end members 18, 20, an intermediate member 22 and opposite side members 24, 26. The opposite end members 18, 20, being of substantially identical configuration, are spaced apart from one another and extend generally parallel to one another. The end members 18, 20 and intermediate member 22, as seen particularly in FIGS. 5 and 6, are in the form of relatively thin elongated plates. The intermediate member 22 is spaced substantially equidistantly between the end members 18, 20 and extends generally parallel thereto. The end and intermediate members 18, 20, 22 together are similarly curved in configuration and have respective inner top edges 18A, 20A, 22A which lie along a common surface S of curved shape that is spaced from and extend circumferentially about a portion of a rotor *102* of a crop material harvesting machine *100*, the rotary combine, when the concave 10 is installed in the combine. The end and intermediate members 18, 20, 22 each has a plurality of openings, more particularly, in configurations of slots or recesses 28, spaced apart from one another and formed in the upper portions of each of the end and intermediate members 18, 20, 22, below and open at their inner top edges 18A, 20A, 22A, such that the spaced apart openings formed in one opposite end member 18 respectively correspond with the spaced apart openings formed in the other opposite end member 20 and the intermediate member 22.

The side members 24, 26 of the frame 12 are spaced from one another and extend generally parallel to one another. The side members 24, 26 also extend transversely between and are rigidly joined to corresponding ends of the curved end and intermediate members 18, 20, 22. The side members 24, 26 are straight in configuration for supporting the frame 12 as part of the casing (not shown) below the rotor (not shown) of the combine.

Figure 7:
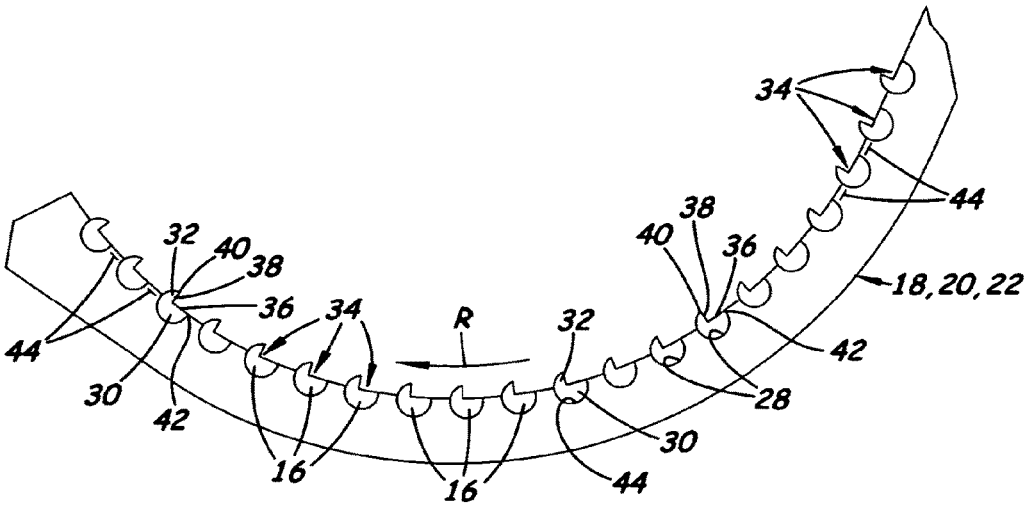
FIG. 7 is an end elevational view of the one end member of the concave as shown in FIG. 5 now also showing the ends of the arrayed threshing elements seatably mounted to the one end member.

Referring now to FIGS. 7-9, the array 14 of elongated threshing elements 16 supported by the frame 12 take the form of a plurality of elongated longitudinally-notched spaced-apart bars 16 supported by the frame 12. The bars 16 are straight in longitudinal extent and round in cross-section, and extend between the opposite end members 18, 20 past the intermediate member 22 of the frame 12. The bars 16 are spaced apart from and extend generally parallel to one another. At their opposite end portions 16A, 16B and an intermediate portion 16C, the bars 16 are seated in the shape-conforming concave slots or recesses 28 formed in the end and intermediate members 18, 20, 22 of the frame 12. Further, the bars 16, at their opposite ends 16A, 16B and intermediate portion 16C, are affixed, using any suitable technique, such as by welding, to the end and intermediate members 18, 20, 22 of the frame 12.

Figure 1:
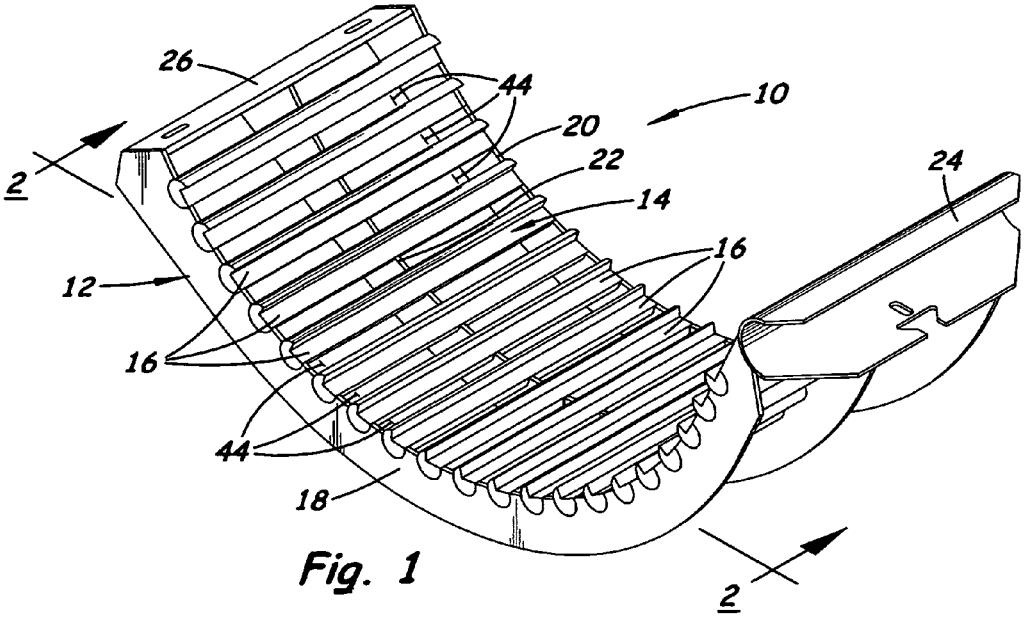
FIG. 1 is a perspective view of an exemplary embodiment of a threshing concave in accordance with the present invention incorporating an array of longitudinally notched spaced apart threshing elements.
Figure 4:
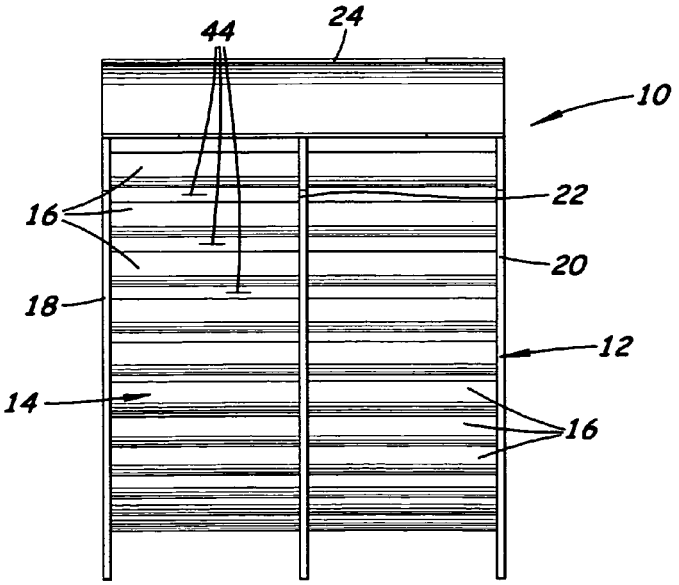
FIG. 4 is a side elevational view of the concave as seen along line 4-4 in FIG. 2.
Figure 2:
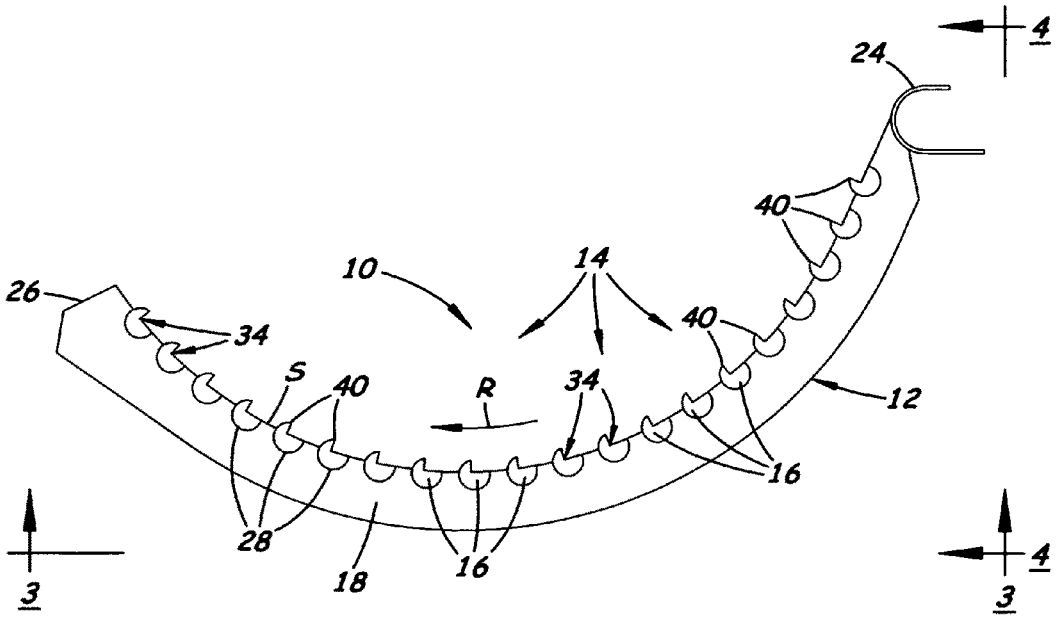
FIG. 2 is an end elevational view of the concave as seen along line 2-2 in FIG. 1.
Figure 3:
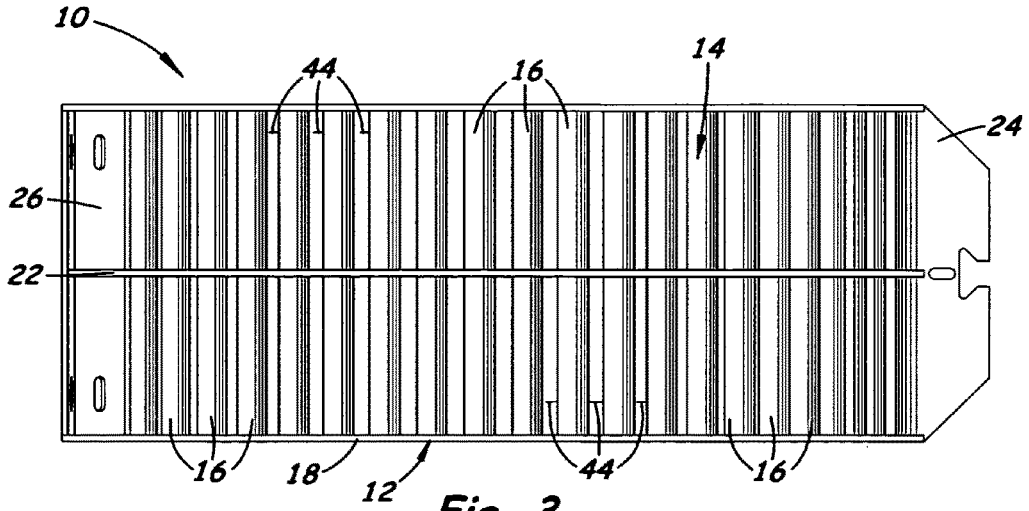
FIG. 3 is a bottom plan view of the concave as seen along line 3-3 in FIG. 2.

More particularly, each elongated bar 16 has a lower portion 30, an upper portion 32 and a longitudinally-extending notch 34. (The notches 34 are also shown in FIG. 1, 2.) The lower portion 30 of each bar 16 has about a semi- or half-cylindrical rounded configuration in cross-section. The lower portion 30 is seated in the shape-conforming concave slots or recesses 28 spaced apart from one another and formed in the frame end and intermediate members 18, 20, 22 below and open at their inner top edges 18A, 20A, 22A. The upper portion 32 of each bar 16 has about a quarter-cylindrical rounded configuration in cross-section. The upper portion 32 merges from the lower portion 30 and extends above the lower portion 30 and the inner top edges 18A, 20A, 22A of the end and intermediate members 18, 20, 22 of the frame 12. Thus, the depths of the recesses 28 into frame members 18, 20, 22 are such that the notches 34 of the bars 16 seated in the recesses 28 are disposed substantially above the top edges 18A, 20A, 22A of the frame members 18, 20, 22.

The longitudinally-extending notch 34 in the bar 16 is defined by first and second surfaces 36, 38 formed on the bar 16 and disposed in a transverse relation to one another, for example through an angle of about 90°. The first surface 36 lies on the lower portion 30 of the bar 16, extending longitudinally along the bar 16 between the opposite end portions 16A, 16B of the bar, forwardly of the upper portion 32 and above the lower portion 30 of the bar 16. The first surface 36 on the lower portion 30 of the bar 16 is generally coextensive with the common surface S of curved configuration in which lie the inner top edges 18A, 20A, 22A of the end and intermediate members 18, 20, 22 of the frame 12. The second surface 38 lies on the upper portion 32 of the bar 16, extending upright from and in the transverse relation to the first surface 36, above the inner top edges 18A, 20A, 22A of the end and intermediate members 18, 20, 22 of the frame 12 and toward the rotor of the crop material harvesting machine. The second surface 38 faces in a direction opposite to the direction of rotation R of the rotor relative to the frame 12 such that second surface 38 defines an exposed forward-facing relatively aggressive threshing edge 40 on the bar 16 for restricting the flow of crop material over and past the bar 16 while the first surface 36 defines an exposed upward-facing edge 42 on the bar 16 for restricting the flow of crop material outwardly through the spaces 44 between the bars 16. Although not shown in FIGS. 2, 5 and 7 in order to simplify illustration of the concave 10, the space 44 between the recesses 28 and thus between the seated bars 16 preferably progressively increase in width or are more open going from one of the side members 24 of the frame 12 to the other side member 26 in the direction of rotation R of the rotor relative to the frame 12 to aid in removing crop material sooner to avoid overloading the following separator section of the casing.

By way of example, not as a limitation, the widths of the spaces 44 may increase from the smallest of about 0.875 inch to the largest of about 1.25 inches. The length of the bars 16 may be about 13.75+/−0.03 inches. The diameter of the bars 16 may be about 1 inch. The width of the first surface 36 may be about 0.625 inch. The width of the second surface 38 may be about 0.375 inch. The radius of the recesses 28 may be slightly greater than 0.5 inch in order to accommodate the bars 16 each having the 0.5 inch radius.

Figure 11:
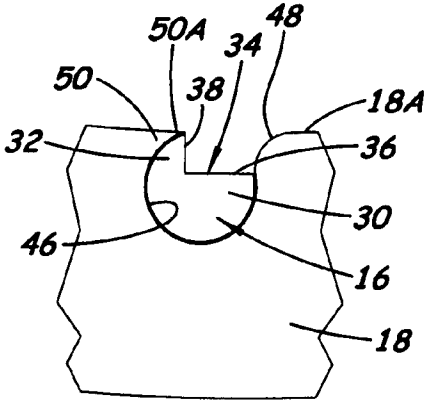
FIG. 11 is an enlarged view of a fragmentary portion of the frame member enclosed by the dashed circle 11 in FIG. 10 now also showing an end view of a threshing element seated in a respective one of the openings of the modified configuration formed in the frame member.
Figure 10:
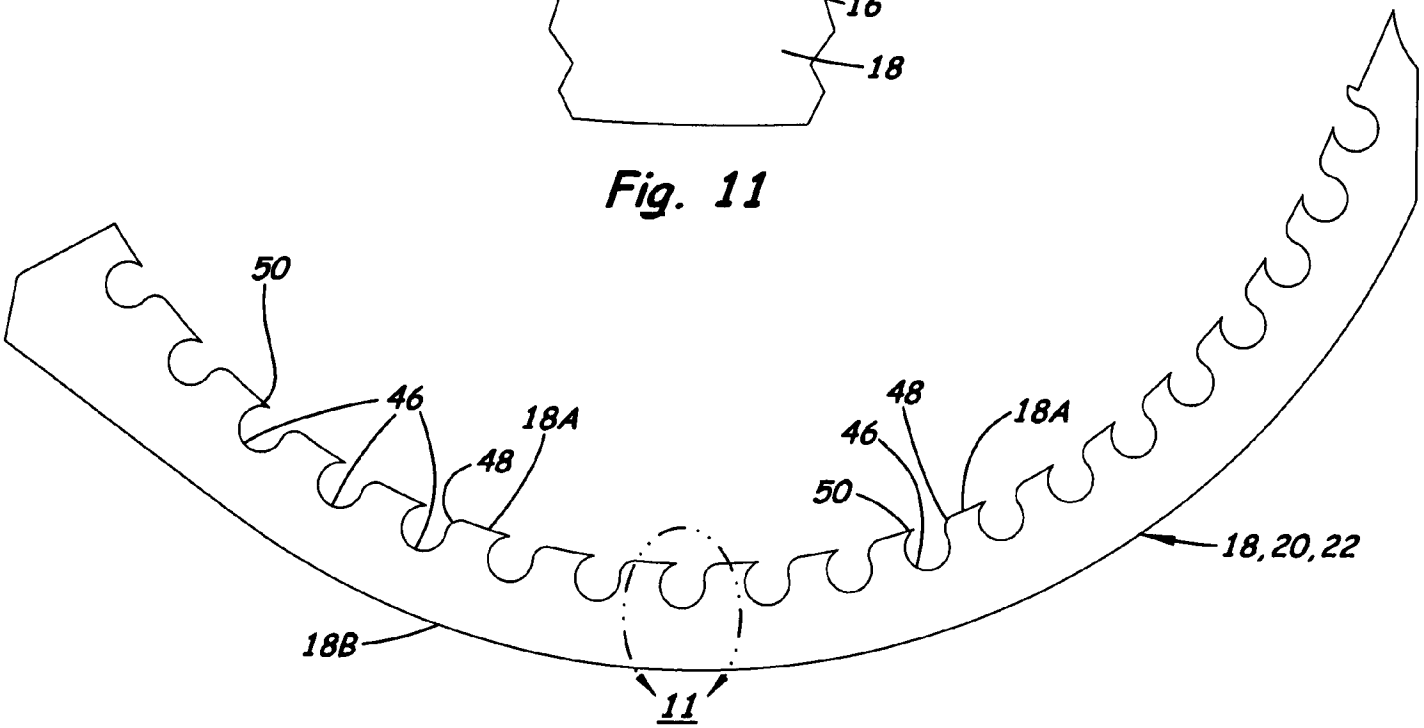
FIG. 10 is an enlarged end elevational view of the same frame member as that shown in FIG. 5 but now having openings of a modified configuration formed in the frame member in place of configurations of the openings shown in FIG. 5.
Figure 12:
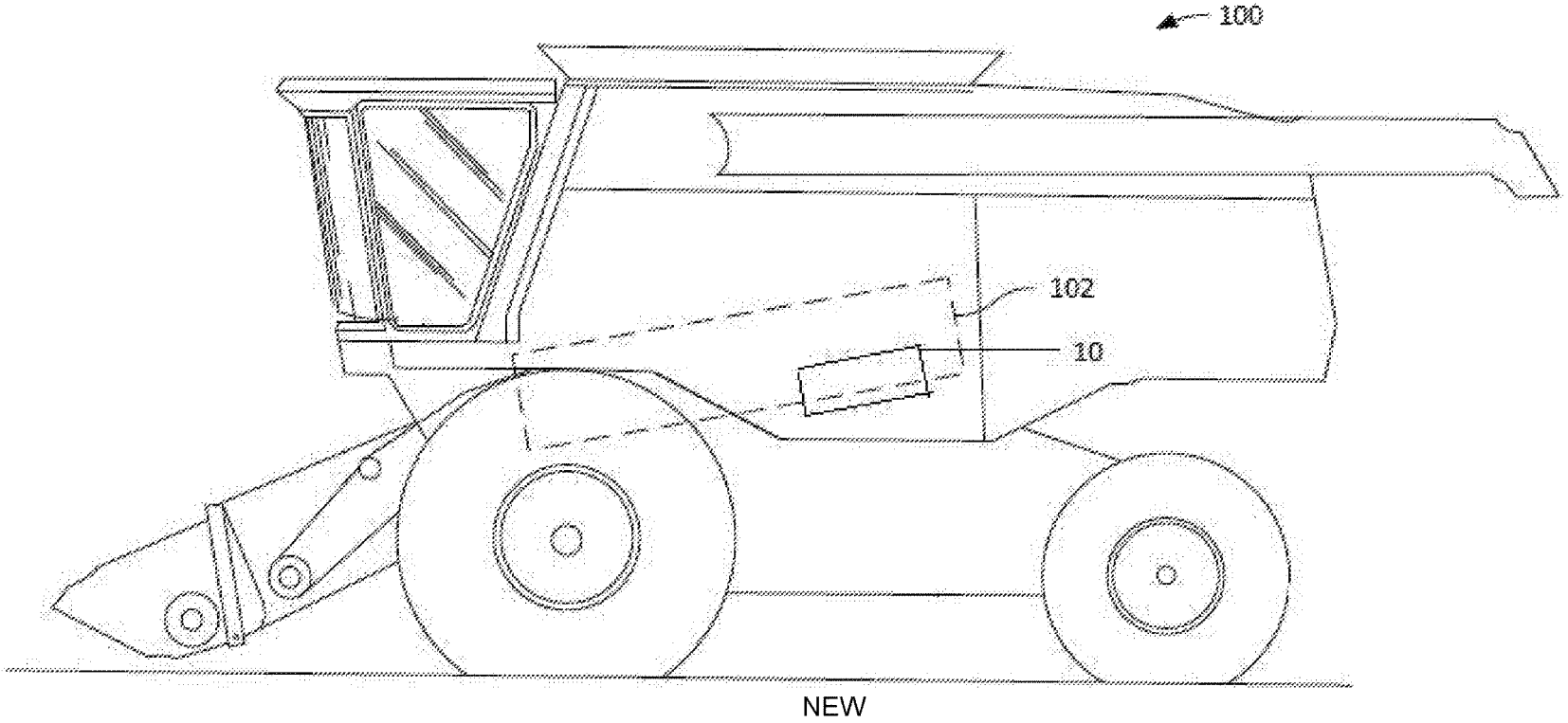
*FIG. 12 Illustrates a combine having a rotor and using the concave shown in the foregoing drawings.*

Referring now to FIGS. 10 and 11, there is shown the same representative one frame member 18, of the frame members 18, 20, 22, as that shown in FIG. 5. Now the frame member 18 (and likewise in the case of the other frame members 20, 22) has a plurality of openings formed therein, more particularly, with modified configurations in the form of substantially circular shaped holes 46 in place of the semi-circular shaped recesses 28 shown in FIG. 5. The holes 46, having the same radius as the recesses 28, are displaced, by way of example, approximately three-eighths inch closer to the bottom edge 18B of the frame member 18 than were the recesses 28. Further, the upper portions of the frame member 18 at the right sides of the holes 46 have rounded configurations that merge with the top edge 18A so as to provide the frame member 18 with rounded edge segments 48 that extend between the holes 46 and the top edge 18A and that are opposite from pointed edge segments 50 on the upper portions of the frame member 18A on the left side of the holes 46 which pointed edge segments 50 backstop the portions of the rods 16 seated in the holes 46, as shown in the case of the representative one rod 16 in FIG. 11. The second surface 38 of the notch 34 on the upper portion 32 of the bar 16 is generally aligned vertically with the tip 50A of the pointed edge segment 50. As also shown in FIG. 10, the center-to-center distances between the holes 46, and thus the widths of the spaces between the rods 16 seated therein, preferably progressively increase going from right to left as seen in FIG. 10. By way of example, not as a limitation, the center-to-center distances may increase from the smallest of about 1.75 inch to the largest of about 2.34 inches. There are nineteen holes 46 and thus the same number of seated bars 16 in the frame member 18 shown in FIG. 10 versus twenty recesses 38 and thus the same number of seated bars 16 in the frame member 18 shown in FIG. 5. Because of the greater depth of the holes 46 from the top edge 18A into the frame member 18 (and likewise in the case of the other frame members 20, 22), the notches 34 of the bars 16 seated in holes 46 are disposed substantially below the top edge 18a of the frame member 18.

It is thought that the present invention and its advantages will be understood from the foregoing description and it will be apparent that various changes may be made thereto without departing from the spirit and scope of the invention or sacrificing all of its material advantages, the forms hereinbefore described being merely exemplary embodiments thereof.

What is claimed is:

1. A threshing concave for an agricultural combine, comprising:

a frame comprised of a plurality of members interconnected to one another and including a pair of said members spaced apart opposite, and extending generally parallel, to one another, each of said opposite members having an upper portion with a top edge thereon and a plurality of openings formed in said upper portion adjacent to and below said top edge, said openings being spaced apart from one another such that said spaced apart openings formed in one of said opposite members respectively correspond with said spaced apart openings formed in the other of said opposite members; and an array of threshing elements supported by and extending between said opposite members of said frame and being spaced apart and extending generally parallel to one another;

said threshing elements being elongated bars [having round configurations in cross-section], each *said elongated* bar having a pair of opposite ends each being respectively seated in a respective one of said corresponding openings of said opposite members of said frame, and a notch formed in said bar and extending longitudinally between said opposite ends of said bar such that said notch defines an aggressive threshing edge recessed into said bar and disposed adjacent to said upper portions of said opposite members of said frame and facing opposite to [the direction of crop material flow relative to said threshing concave] *a direction of movement of a rotor of the agricultural combine*.

2. The concave of claim 1 wherein each bar at each of its opposite ends is affixed to a respective one of said opposite members of said frame proximate to said opening in which said opposite end of said bar is seated.

3. The concave of claim 2 wherein each bar has:

an upper portion with said notch formed in said each bar adjacent to said upper portion; and a lower portion underlying said upper portion and said notch.

4. The concave of claim 3 wherein said upper portion has substantially a quarter-cylindrical configuration in cross-section and said lower portion has substantially a semi-cylindrical configuration in cross-section.

5. The concave of claim 1 wherein each bar has an upper portion and a lower portion underlying said upper portion such that said upper portion extends upwardly from said lower portion with said notch adjacent to said upper portion and above said lower portion of said bar.

6. The concave of claim 5 wherein said notch of said each bar is defined by a first surface on said lower portion of said bar and a second surface on said upper portion of said bar extending upright from and in transverse relation to said first surface.

7. The concave of claim 1 wherein spacing between said openings in said upper portion of each of said opposite members of said frame and thus the spaces between said bars seated in said openings progressively increase in width going from one end of said frame to an opposite end of said frame.

8. The concave of claim 1 wherein said plurality of members of said frame further includes at least one intermediate member spaced between and extending generally parallel to said opposite members of said frame.

9. The concave of claim 8 wherein said opposite and intermediate members together are curved in configuration such that said top edges thereof lie along a common surface curved in configuration.

10. The concave of claim 8 wherein said intermediate member has a top edge and openings formed in said intermediate member adjacent to and below said top edge and corresponding to said openings of said opposite members such that said bars are also seated in said openings of said intermediate member.

11. The concave of claim 10 wherein said openings are formed in said opposite and intermediate members such that said notches of said bars are disposed substantially above said top edges of said opposite and intermediate members.

12. The concave of claim 10 wherein said openings are formed in said opposite and intermediate members such that said notches of said bars are disposed substantially below said top edges of said opposite and intermediate members.

13. A threshing concave for an agricultural combine, comprising:

a frame including a pair of opposite side members, and a pair of opposite end members spaced apart from and extending generally parallel to one another and having ends joined to corresponding ends of said opposite side members, said opposite end members each having an upper portion with a top edge thereon and openings formed in said upper portion of said each opposite end member adjacent to and below said top edge, said openings being spaced apart from one another such that said openings in one of said opposite members respectively correspond with said openings in the other of said opposite members; and an array of elongated threshing bars spaced apart and extending generally parallel to one another, said bars being straight in longitudinal extent [and round in cross-section], said each bar having a pair of opposite ends each being respectively seated in a respective one of said corresponding openings in said opposite end members of said frame, a lower portion, an upper portion, and a notch defining an aggressive threshing edge recessed into said bar adjacent to said upper portion of said bar and above said lower portion of said bar, said notch longitudinally extending between said opposite ends of said bar such that each of said notches is disposed adjacent to said upper portions of said end members of said frame and face opposite to [the direction of crop material flow relative to said concave] *a direction of rotation of a rotor of the agricultural combine*.

14. The concave of claim 13 wherein said upper portion of said each bar has substantially a quarter-cylindrical configuration in cross-section and said lower portion of said each bar has substantially a semi-cylindrical configuration in cross-section, said lower portion of said each bar underlies said upper portion and said notch.

15. The concave of claim 13 wherein said notch in said each bar is defined by a first surface on said lower portion of said bar and a second surface on said upper portion of said bar extending upright from and in transverse relation to said first surface.

16. The concave of claim 13 wherein spacing between said openings of said opposite end members and thus the spaces between said bars seated in said openings progressively increase in width going from one of said opposite side members to the other of said opposite side members.

17. The concave of claim 13 wherein said frame further includes at least one intermediate member spaced between and extending generally parallel said opposite end members, said intermediate member also extending between and joined to said opposite side members.

18. The concave of claim 17 wherein said opposite end members and intermediate member together are curved in configuration such that said top edges thereof lie along a common surface curved in configuration.

19. The concave of claim 17 wherein said intermediate member has a top edge and openings formed in said intermediate member adjacent to and below said top edge and corresponding to said openings of said opposite end members such that said bars are seated in said openings of said intermediate member.

20. The concave of claim 19 wherein said openings are formed in said opposite end and intermediate members such that said notches of said bars seated in said openings are disposed substantially above said top edges of said end and intermediate members.

21. The concave of claim 19 wherein said openings are formed in said opposite end and intermediate members such that said notches of said bars seated in said openings are disposed substantially below said top edges of said end and intermediate members.

*22. A threshing bar for use in a threshing concave for use in an agricultural combine, the concave having a frame with a first member and a second member spaced apart opposite, and extending generally parallel, to each other, the first member and the second member each having an upper portion with a top edge thereon and a plurality of openings formed in the upper portion adjacent to and below the top edge, the openings being spaced apart from one another such that the spaced apart openings formed in first member respectively corresponds with the spaced apart openings formed in the second member, the threshing bar comprising:*

*a threshing element configured to be supported by and extend between the first member and the second member, said threshing element being an elongated bar having a pair of opposite ends each being configured to be respectively seated in a respective one of the corresponding openings of the first member and the second member of the frame; and*

*a notch formed in said bar and extending longitudinally between said opposite ends of said bar such that said notch defines an aggressive threshing edge recessed into said bar and disposed adjacent to the upper portions of the first and second members of the frame and being further configured to face opposite to a direction of movement of a rotor of the agricultural combine.*

* * * * *